(12) United States Patent
Cheng

(10) Patent No.: US 7,460,446 B2
(45) Date of Patent: Dec. 2, 2008

(54) METHOD AND SYSTEM FOR GENERATING A FEEDBACK SIGNAL IN OPTICAL DISC DRIVES

(75) Inventor: Hsin-Ping Cheng, Hsin-Chu (TW)

(73) Assignee: Lite-On IT Corporation, Taipei (TW)

( * ) Notice: Subject to any disclaimer, the term of this patent is extended or adjusted under 35 U.S.C. 154(b) by 635 days.

(21) Appl. No.: 11/196,345

(22) Filed: Aug. 4, 2005

(65) Prior Publication Data

US 2006/0028963 A1 Feb. 9, 2006

(30) Foreign Application Priority Data

Aug. 6, 2004 (TW) .............................. 93123705 A

(51) Int. Cl.
*G11B 7/00* (2006.01)

(52) U.S. Cl. ............... 369/44.32; 369/47.17; 369/53.32

(58) Field of Classification Search ............. 369/44.32, 369/47.1, 47.17, 47.18, 53.12, 53.32, 53.34, 369/53.35
See application file for complete search history.

(56) References Cited

U.S. PATENT DOCUMENTS 5,526,200 A * 6/1996 Yada ........................... 360/51

* cited by examiner

*Primary Examiner*—Nabil Z Hindi
(74) *Attorney, Agent, or Firm*—Stout, Uxa, Buyan & Mullins, LLP

(57) ABSTRACT

A method for generating a feedback signal in optical disc drives is disclosed. Firstly RF signal is generated by a pickup head and coupled to a converter to generate a digital signal. Then a detector generates a plurality of pseudo-jitter according to the digital signal. Thereafter a calculator receives the said pseudo-jitter and calculates for outputting a feedback signal to the pickup head.

22 Claims, 4 Drawing Sheets

METHOD AND SYSTEM FOR GENERATING A FEEDBACK SIGNAL IN OPTICAL DISC DRIVES

BACKGROUND OF THE INVENTION

1. Field of the Invention

The present invention generally relates to a method and system for generating a feedback signal in optical disc drives, and more particularly to a method and system to use the pseudo-jitter for generating the feedback signal.

2. Description of the Prior Art

In conventional optical disc drives, the jitter is normally an index to determine the performance of the optical disc drives. The optical system of the pickup head is an important factor for determining the performance of the optical disc drives. In other words, if the pickup head has an improper design, the jitter will be higher than as usual. By this, the optical disc drives normally feedback a jitter signal to the pickup head for correcting the optical system. For instance, in blue-ray disc drives, in order to compensate the spherical aberration, which caused by the different thickness or the double layer of disc, the jitter signal is normally used to generate a feedback signal for compensating the error that caused by the spherical aberration.

FIG. 1 shows a conventional feedback system of optical drives. The pickup head 101 is for reading radio frequency (RF) signal. The filter 102 is for pre-processing the RF signal. The analog-to-digital converter (ADC) 103 samples the RF signal and converts it to a digital signal. After the equalizer 104 equalizes and compensates the digital signal, the output of the equalizer 104 transmits into two paths. One path is to phase-lock loop (PLL) 109 and the PLL 109 feedbacks signal to ADC 103 and equalizer 104 for providing the clock, for processing digital signal. The other one path of the equalizer 104 is to the digital-to-analog converter (DAC) 105, which is for transferring digital signal into analog signal. Then the analog signal is processed by the low-pass filter (LPF) 106 and the slicer 107 and inputted to jitter meter 108. The jitter meter 108 detects the jitter by comparison of the outputting signal of the slicer 107 and generated clock of the PLL 109. The jitter detecting is complexity because the jitter detecting is based on analog signal. The detected jitter is feedback to the pickup head for controlling the focus area of the pickup head.

The jitter detecting is as shown in FIG. 2. The axes 303 and 304 represent a reference level (hereinafter, for example a zero level). The waveform 301 represents a waveform with zero jitter observing from the point A, which is shown in FIG. 1. The waveform 302 represents a waveform with jitter, which is not zero observing from the point A. By comparison of the waveform 301 and 302, there exists a phase shift 305 between the point 3011 and 3021. The phase shift 305 here is so-called jitter and it is normally defined in standard. In other words, the jitter detecting must be based on analog processing. The prior jitter meter detects the phase shift, transfers the phase shift to voltages and finally feedbacks to the pickup head for controlling the focus area.

According to the previous mentioned, the feedback signal could not be digitalized in prior art. There are some disadvantages such as: rebuilding original signal difficulty, signal delay and signal distortion due to converting digital-to-analog and analog-to-digital many times. For example: in order to compensate the spherical aberration, which caused by the different thickness or the double layer of disc, the jitter signal is normally used to generate a feedback signal for compensating the error that caused by the spherical aberration. However, the feedback circuit described above may lead to a large amount of cost and problems of integrating in blue-ray disc drive.

SUMMARY OF THE INVENTION

According to the prior art that cannot effectively digitizing for the system, the invention provides the pseudo-jitter for generating a feedback signal. One object is effectively digitizing.

Another object of the invention is to reduce the system complexity and the cost. The invention provides a method and system for generating feedback signal to forsake the method of the analog jitter detecting of the prior art. The invention uses an easy way to detect the voltage difference as a pseudo-jitter for the feedback signal.

Another object of the invention provides a new feedback signal for the beam expander of an optical disc drive. The invention provides a method and a system processing radio frequency (RF) signal and equalizing the RF signal. After adjusting, the feedback signal is generated based on the deviation of the voltage level of the processed RD signal.

According to the said objects, a method for generating a feedback signal in optical disc drives is disclosed. Firstly RF signal is generated by a pickup head and coupled to a converter to generate a digital signal. Then a detector generates a plurality of pseudo-jitter according to the digital signal. Thereafter a calculator receives the said pseudo-jitter and calculates for outputting a feedback signal to the pickup head.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENTS

Some sample embodiments of the invention will now be described in greater detail. Nevertheless, it should be recognized that the present invention could be practiced in a wide range of others.

The present invention will be described in detail with reference to the accompanying drawings. It should be noted that the drawings are in greatly simplified form and in order to provide a clear illustration and understanding of the present invention.

The feedback system of the optical disc drive includes as follows. A pickup head is for generating a radio frequency (RF) signal. A converter couples with the RF signal for generating a digital RF signal wherein the converter converts analog signals to digital signals. A detector receives the digital RF signal for generating pseudo-jitters, which are the distance between the digital RF signal and zero level when the digital RF signal across the zero level. A calculator receives pseudo-jitters and generates a feedback signal based on the received pseudo-jitters to the pickup head.

Figure 1:
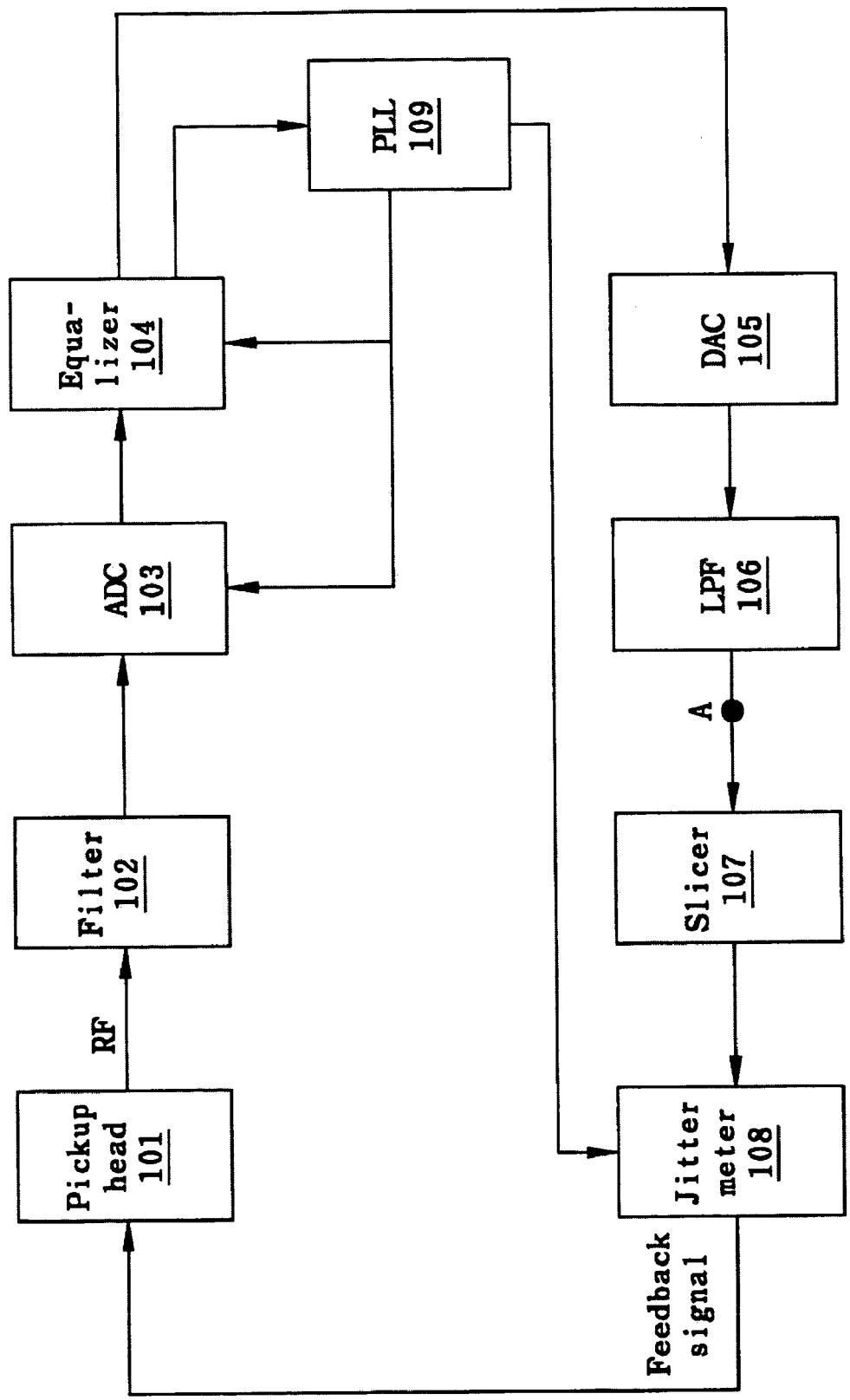
FIG. 1 is a schematic diagram illustrating a feedback system of the optical disc drive according to prior art.
Figure 2:
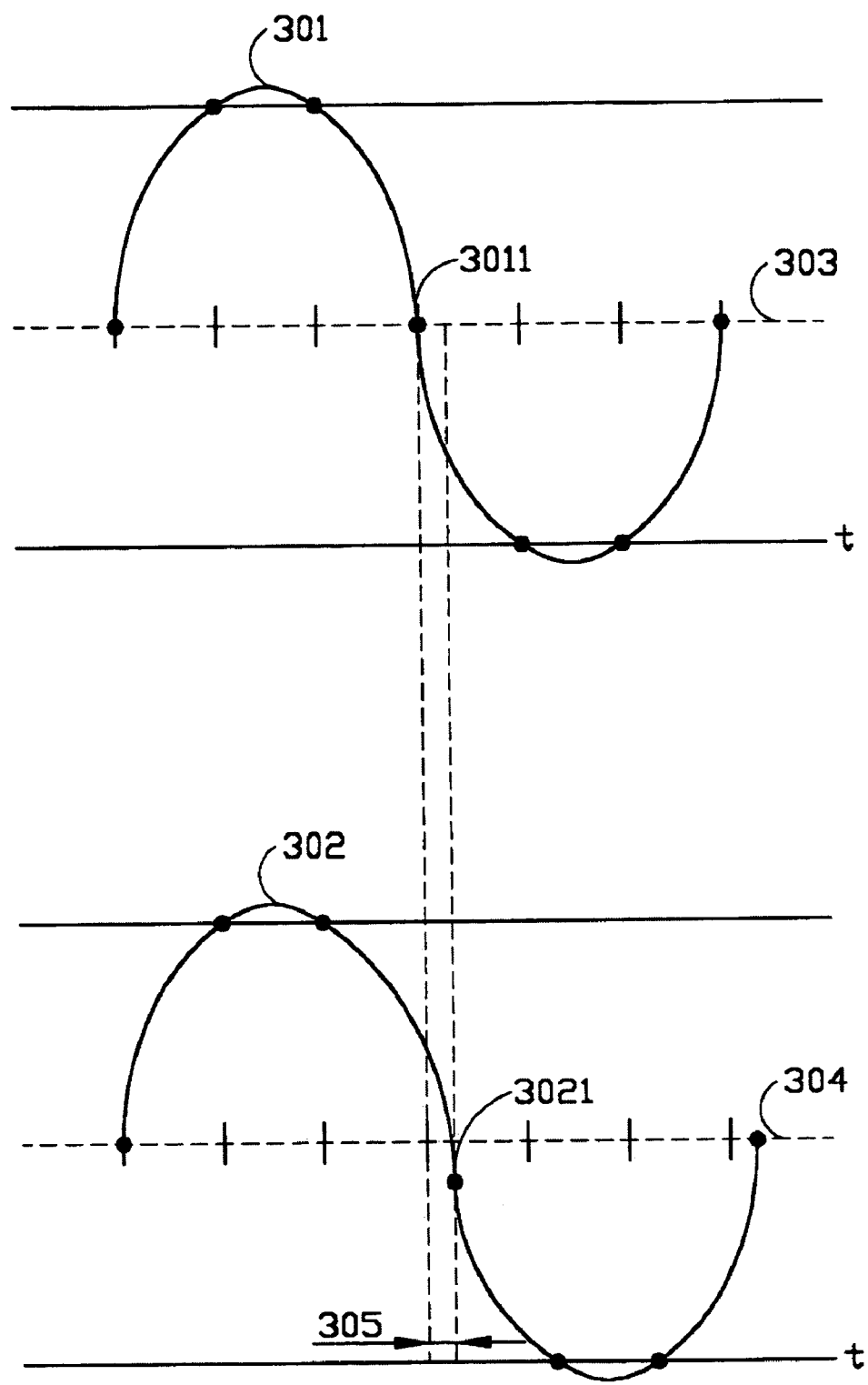
FIG. 2 is a schematic diagram illustrating a measurement of the jitter according to prior art.
Figure 3:
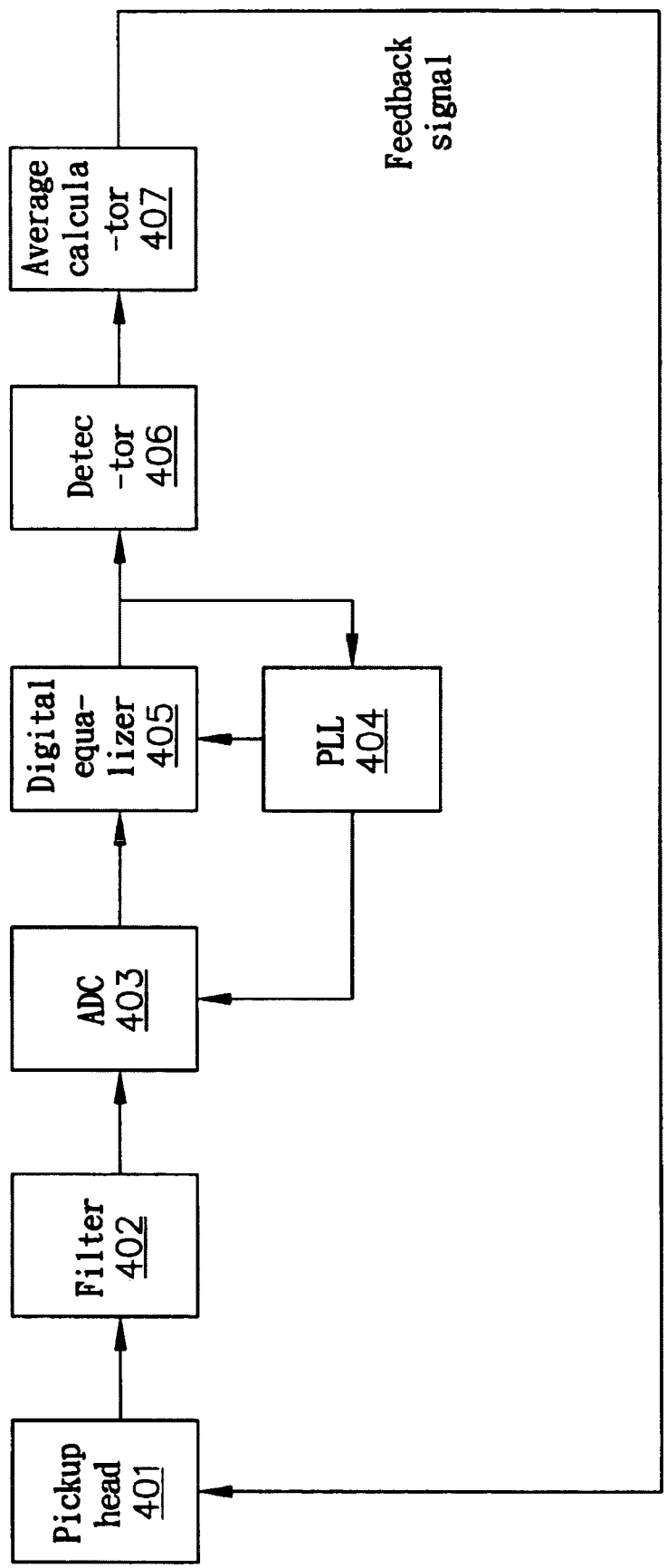
FIG. 3 is a schematic diagram illustrating a feedback system of the optical disc drive according to the invention.

Referring FIG. 3, it is a schematic diagram illustrating a feedback system of the optical disc drive according to the invention. A pickup head 401 emits a laser beam to a rotated disc and receives the reflected light. According to the reflected light the pickup head 401 outputs a RF signal. In one embodiment, the laser emits a blue-ray beam with various powers for reading or writing a disc. The pickup head 401 can further includes a beam expander for compensating the spherical aberration caused by uneven thickness of discs. The beam expander also adjusts the spot size of the laser beam. For example: the beam expander adjusts the spot size of the laser beam in order to read/write record layers that require different focus positions. Furthermore, the beam expander also receives a feedback signal to adjust the spot size for eliminating the spherical aberration.

The filter 402 receives the RF signal and processes it in noise filtering and analog equalizing. However, it is not limited; the filter 402 further includes an amplifier, such as: pre-amplifier for amplifying the RF signal. In one embodiment, the filter 402 includes a pre-low pass filter (LPF) and high pass filter (HPF) for filtering the unwanted noise out of working frequency. The analog-to-digital converter (ADC) 403 converts the filtered RF signal by the filter 402 to a digital signal. The digital equalizer 405 receives the digital signal for equalizing and compensating the digital signal. In one embodiment, the digital equalizer 405 can be a limit equalizer. The limit equalizer is for limiting the amplitude of the digital signal and make the digital signal passing through the zero level. By this, it not only improves the signal-to-noise ratio (SNR) of the digital signal but also benefit the following signal processing. The function of the digital equalizer 405 in this embodiment is mainly, but not limited, for adjusting the digital signal to a zero level The digital RF signal, being passed by digital equalizer 405 for equalizing and compensating, are separated to two output paths. One path is to phase-lock loop (PLL) 404. And the output of PLL 404 feedbacks to the ADC 403 and the digital equalizer 405 in order to provide the clock, which is for processing digital signal. The other path is to the detector 406. The detector 406 detects the offset of digital signal (i.e. the difference between the digital signal level and the zero level). The offset is to be a pseudo-jitter in this embodiment. In the embodiment, a average value, such as root mean square or arithmetic mean etc., is operated based on the pseudo-jitter by means of average calculator 407, Then, the average value as a feedback signal feedbacks to the pickup head 401 for adjusting the beam expander.

Figure 4:
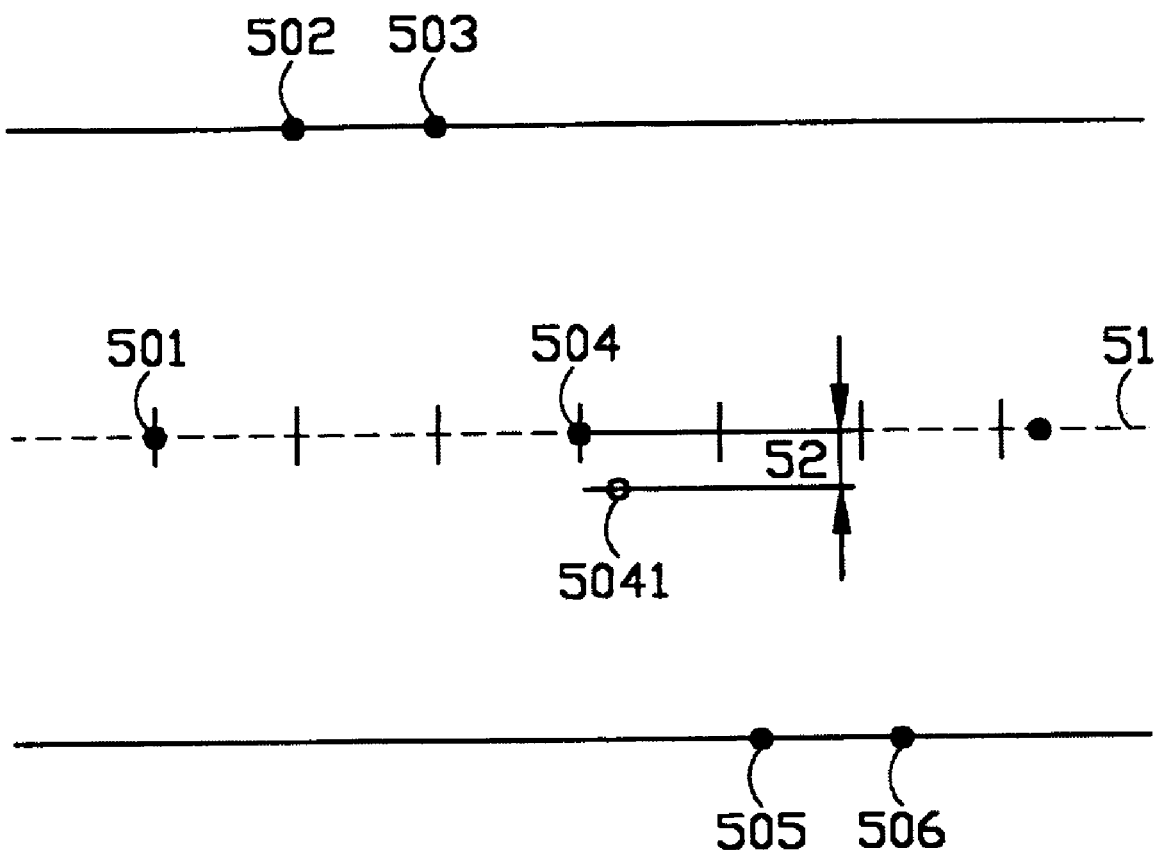
FIG. 4 is a schematic diagram illustrating a measurement of the pseudo-jitter according to the invention.

FIG. 4 is a schematic diagram illustrating a measurement of the pseudo-jitter according to the invention. The axis 51 represents a zero level. The RF signal passes by an ADC and an equalizer thereto generate the RF digital signal, for example the points 501, 502, 503, 504, 505 and 506, In one embodiment, the points 501, 502, 503, 504, 505 and 506 represent the RF digital signal when the optical system of the pickup head with no jitter. The levels are 0, 2, 2, 0, −2 and −2, respectively. However, in many circumstances, such as: spherical aberration caused by the uneven thickness of the disc or the heat noise etc., can lead to jitter. For example: the point 504 shifts to the deviation point 5041 because of spherical aberration. In other word, the deviation point 5041 is original located on the zero level point 504. In the embodiment, the detector detects the level difference 52 between the point 504 and the deviation point 5041 and the absolute value of the level difference 52 is the pseudo-jitter of the invention.

It is noted that the pseudo-jitter is the level difference between the digital signal on the zero level and the deviation level that is originally on the zero level. And it is further to say that the pseudo-jitters normally are symmetric to the zero axis. If the RF signal is in a poor quality, the pseudo-jitter is higher, otherwise, if the RF signal is in good quality, the pseudo-jitter is lower. As the result, the pseudo-jitter is acceptable as the feedback signal. And under the system, there is no need to convert the converted signal from digital to analog. For the industrial applicability, the invention reduces the cost and improves the product quality.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A method for generating a feedback signal in an optical disc drive, comprising:
   receiving an RF (Radio Frequency) signal;
   digitizing said RF signal for generating a digital signal;
   adjusting said digital signal from an original level to a predefined level;
   detecting a plurality of pseudo-jitters of said adjusted digital signal; and
   generating a feedback signal, wherein said generating comprises computing the root mean square of said plurality of pseudo-jitters for generating said feedback signal.

2. The method according to claim 1, wherein said digitizing is sampling according to the clock generated by a phase-lock loop.

3. The method according to claim 1, wherein said adjusting step comprises equalizing said digital signal.

4. The method according to claim 1, wherein said plurality of pseudo-jitters is calculated by the distance between said digital signal and said predefined level.

5. A method for generating a feedback signal in an optical disc drive, comprising:
   receiving an RF (Radio Frequency) signal;
   digitizing said RF signal for generating a digital signal;
   adjusting said digital signal from an original level to a predefined level;
   detecting a plurality of pseudo-jitters of said adjusted digital signal; and
   generating a feedback signal, wherein said generating comprises computing the arithmetic mean of said plurality of pseudo-jitters for generating said feedback signal.

6. A feedback system for an optical disc drive, comprising:
   a pickup head generating a RF signal;
   a converter coupled to said RF signal for generating a digital signal;
   a detector receiving said digital signal for generating a plurality of pseudo-jitters; and
   a calculator receiving said plurality of pseudo-jitters and having a calculation for generating a feedback signal to control said pickup head, wherein said calculation is computing the root mean square of said plurality of pseudo-jitters.

7. The feedback system according to claim 6, wherein said pickup uses a blue-ray laser.

8. The feedback system according to claim 6, wherein said converter comprises an analog-to-digital (A/D) converter and a digital equalizer.

9. The feedback system according to claim 8, wherein said analog-to-digital (A/D) converter and said digital equalizer are controlled by a phase-lock loop (PLL).

10. The feedback system according to claim 8, wherein said digital equalizer is a limit equalizer.

11. The feedback system according to claim 6, further comprising a beam expander receiving said feedback signal to control said pickup head.

12. The feedback system according to claim 6, wherein said plurality of pseudo-jitters is the distance between said digital signal and a reference level.

13. The method according to claim 5, wherein said digitizing is sampling according to the clock generated by a phase-lock loop.

14. The method according to claim 5, wherein said adjusting step comprises equalizing said digital signal.

15. The method according to claim 5, wherein said plurality of pseudo-jitters is calculated by the distance between said digital signal and said predefined level.

16. A feedback system for an optical disc drive, comprising:
a pickup head generating an RF signal;
a converter coupled to said RF signal for generating a digital signal;
a detector receiving said digital signal for generating a plurality of pseudo-jitters; and
a calculator receiving said plurality of pseudo-jitters and having a calculation for generating a feedback signal to control said pickup head, wherein said calculation is computing the arithmetic mean of said plurality of pseudo-jitters.

17. The feedback system according to claim 16, wherein said pickup uses a blue-ray laser.

18. The feedback system according to claim 16, wherein said converter comprises an analog-to-digital (A/D) converter and a digital equalizer.

19. The feedback system according to claim 18, wherein said analog-to-digital (A/D) converter and said digital equalizer are controlled by a phase-lock loop (PLL).

20. The feedback system according to claim 18, wherein said digital equalizer is a limit equalizer.

21. The feedback system according to claim 16, further comprising a beam expander receiving said feedback signal to control said pickup head.

22. The feedback system according to claim 16, wherein said plurality of pseudo-jitters is the distance between said digital signal and a reference level.

* * * * *